July 2, 1940.   F. C. WERNER   2,206,312
COOKY CUTTING MECHANISM
Filed June 26, 1939   4 Sheets-Sheet 1
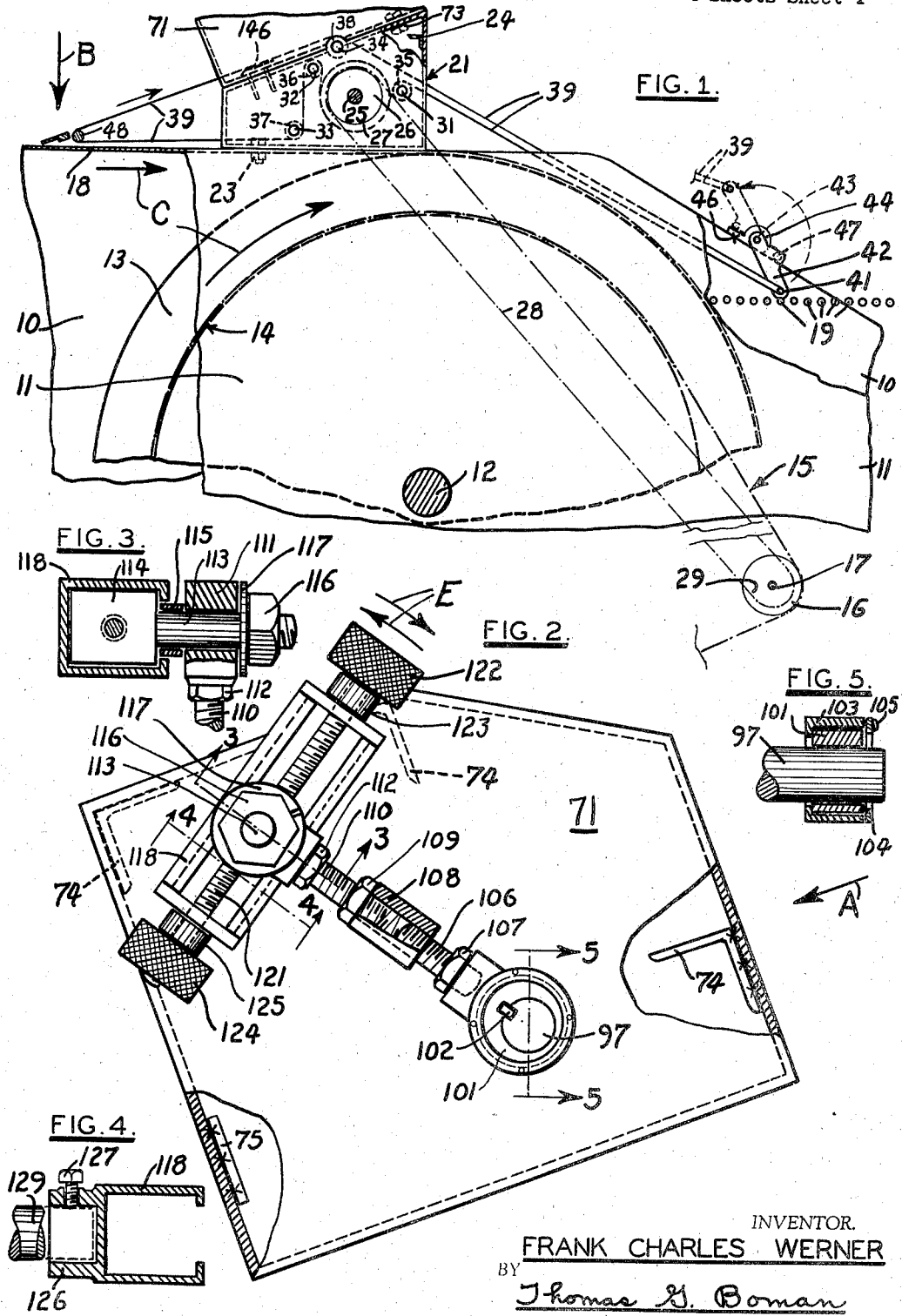
INVENTOR.
FRANK CHARLES WERNER
BY Thomas G. Boman
ATTORNEY.

July 2, 1940.　　　　　F. C. WERNER　　　　　2,206,312
COOKY CUTTING MECHANISM
Filed June 26, 1939　　　　　4 Sheets-Sheet 2
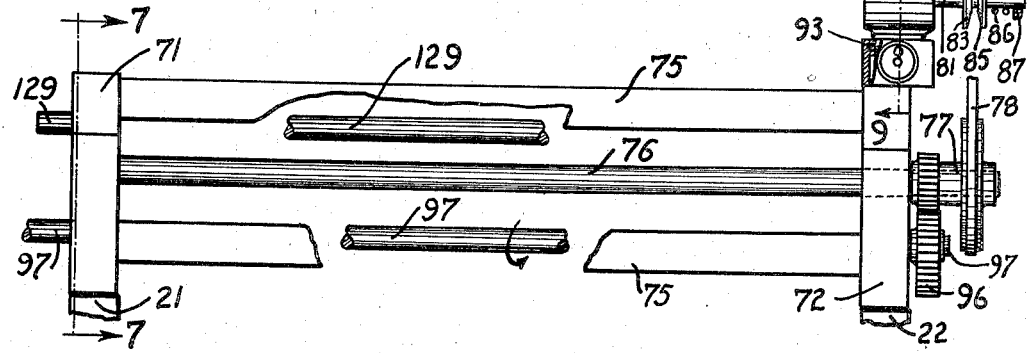
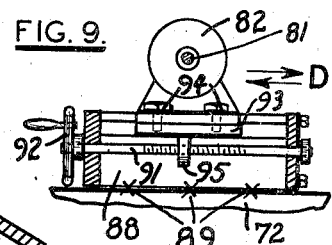
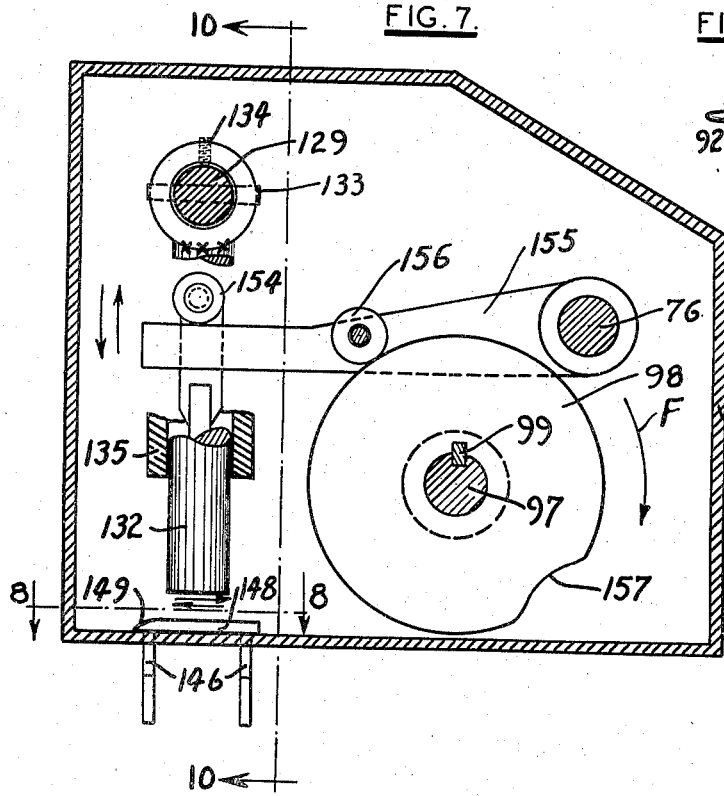
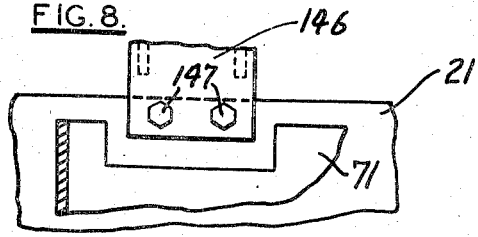
INVENTOR.
FRANK CHARLES WERNER
BY Thomas G. Boman
ATTORNEY.

July 2, 1940.  F. C. WERNER  2,206,312
COOKY CUTTING MECHANISM
Filed June 26, 1939  4 Sheets-Sheet 3
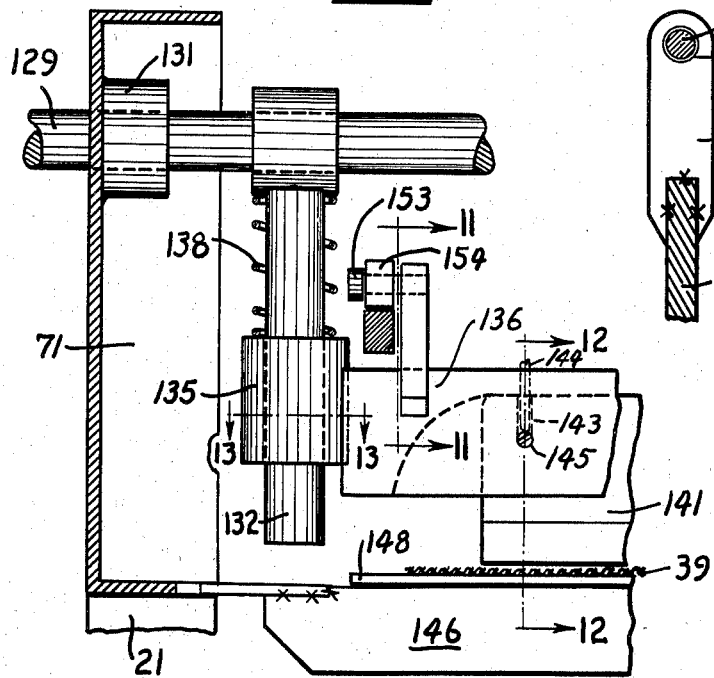
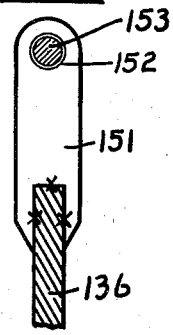
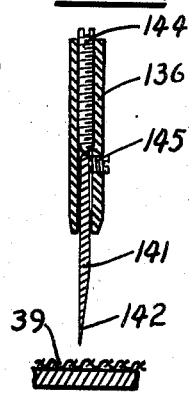
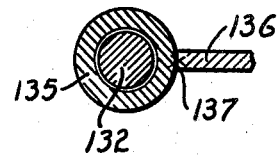
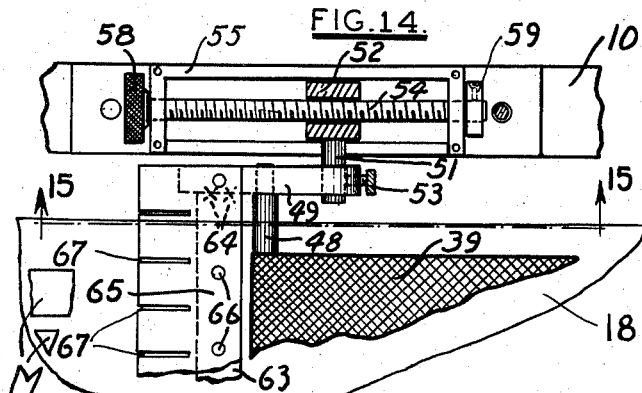
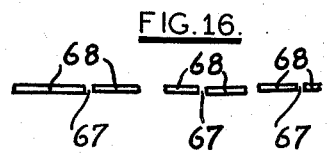
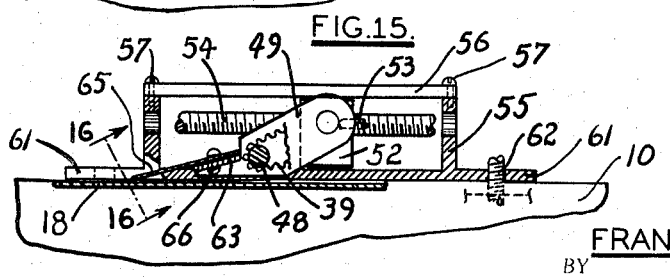
INVENTOR.
FRANK CHARLES WERNER
BY Thomas G. Boman
ATTORNEY.

INVENTOR.
FRANK CHARLES WERNER
BY Thomas G. Boman.
ATTORNEY.

Patented July 2, 1940

2,206,312

UNITED STATES PATENT OFFICE 2,206,312

COOKY CUTTING MECHANISM

Frank Charles Werner, Grand Rapids, Mich.

Application June 26, 1939, Serial No. 281,193

11 Claims. (Cl. 107—21)

This invention relates generally to means for operating upon a moving element or strip or strips of material and more particularly to cooky cutting mechanism.

Previous to my invention it has not been possible to cut a continuously emerging cooky bar, as a fig newton, into the desired lengths and, obviously, delay is encountered by the present practice of baking this type of cookies in strips in rather long pans, then removing the pans from the oven, then cutting the strips into the desired lengths by moving a knife across a plurality of strips.

In my novel structure it is possible to bake the plurality of strips of material in a long oven, from which they continuously emerge, and to cut them without stopping their movement, this giving the streamline movement of production which is so desirable in the present day and age.

One of the main advantages of my invention is that the mechanism gives a perfect cut-off to the cookies and does not spoil their appearance by crushing their ends. This adds to their sale value as it shows the filling of the cooky or its inner structure to the best advantage.

Another feature along this same line lies in the fact that the cutting blade does not travel completely through the cooky, the cookies being finally separated by tilting action or gravity action as the cookies sequentially pass around an abrupt turn in their supporting belt. Thus the end of a cooky shows a cut portion and a broken portion which, under certain conditions, gives it a two-toned effect. Also, by this operation, the cutting blade does not touch the carrier or conveying belt and no damage may result thereto.

Another main advantage of my invention is that I control and regulate the speed of lateral travel of the cutting blade so that it moves at practically the same rate of speed as the material which is being cut during the cutting operation. Thus there is no pushing or pulling action upon the cookies as they are being severed and thus their ends remain an even thickness. This gives a regularly shaped cooky which stacks and packages well. It will be understood that the cookies, as they emerge from the oven, are rather soft and pliable and delicate and must be handled gently in order to prevent mutilation or distortion thereof.

Another very material advantage of my invention lies in the fact that it eliminates much waste over the prior method of baking strips of the desired type of cookies in pans because the "ends," with the exception of the starting and stopping of the machine, are eliminated. In the pan method, each of the many strips of baked material has two ends which are wasted and discarded due to their odd or different shape and different baked characteristics. Thus it will be readily understood that I eliminate substantially all waste. And, additionally, the rate of production of the cookies may be materially speeded up.

Another advantage is that I provide my attachment with swinging parts whereby it may be swung out of the way when it is not in use. The scraping blade, of novel construction, can be swung upwardly from the main feeding conveyor therebelow, and likewise the discharging bight of the auxiliary belt can be elevated from the turntable.

Yet another advantage lies in my particular arrangement of the cam disc, the rocker arm and the spring, this giving a snap action of the cutting knife whereby efficient and quick cutting of the strips, as previously referred to, is obtained.

Another feature of my invention is my controlling of the length of swing of the cutting knife and thus indirectly controlling the speed. Thus the speed of the cutting knife may be made to equal the speed of travel of the strip therebelow which is to be cut.

Other advantages and features will be understood as the description proceeds.

In the drawing:

Fig. 1 is a fragmentary view, more or less diagrammatic and broken away, showing my mechanism in place upon a conveying means.

Fig. 2 is an end view of my mechanism, this mechanism being shown in Fig. 1 only in part and resting upon the trapezoidally shaped subframe shown therein.

Fig. 3 is a cross sectional view taken along the plane of the line 3—3 of Fig. 2.

Fig. 4 is a cross sectional view taken along the plane of the line 4—4 of Fig. 2.

Fig. 5 is a cross sectional view taken along the plane of the line 5—5 of Fig. 2.

Fig. 6 is a side view, as indicated by the arrow A in Fig. 2, of the main cross frame, parts being broken away in order to expedite the disclosure.

Fig. 7 is an enlarged cross sectional view taken along the line 7—7 of Fig. 6.

Fig. 8 is a fragmentary plan view taken along the line 8—8 of Fig. 7.

Fig. 9 is a cross sectional view taken along the line 9—9 of Fig. 6, indicating the adjustable motor mounting.

Fig. 10 is a cross sectional view taken along the plane of the line 10—10 of Fig. 7.

Figs. 11 and 12 are cross sectional views taken along the lines 11—11 and 12—12, respectively, these views being enlarged slightly, of Fig. 10.

Fig. 13 is a cross sectional view taken along the plane of the line 13—13 of Fig. 10.

Fig. 14 is an enlarged fragmentary view, parts being broken away, of the scraper blade mounting as indicated by the arrow B, see Fig. 1.

Fig. 15 is a cross sectional view taken along the plane of the line 15—15 of Fig. 14.

Fig. 16 is a cross sectional view taken along the plane of the line 16—16 of Fig. 15.

Figure 17:
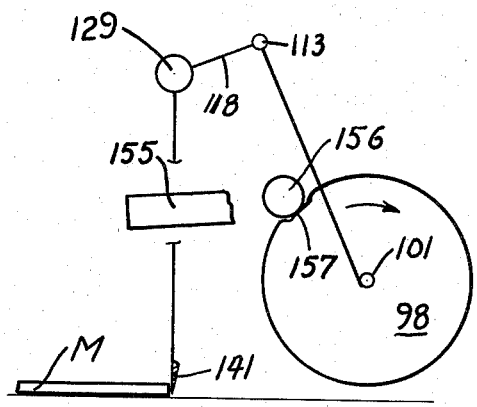

Fig. 17 is a diagrammatic view showing the positions of the several moving parts when the blade is in its lowered and medial position.

Figure 18:
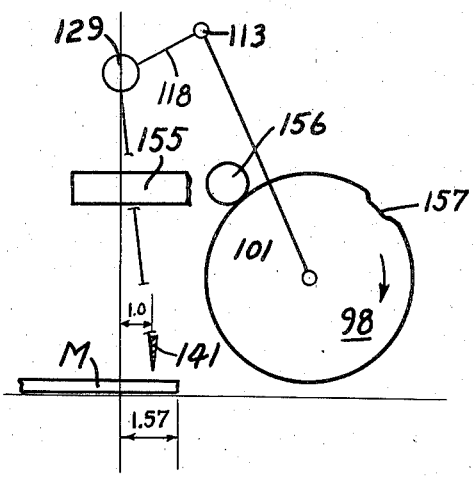

Fig. 18 is a view similar to Fig. 17 with the cam shown rotated clockwise through a quarter of a revolution and the other parts correspondingly advanced.

Figure 19:
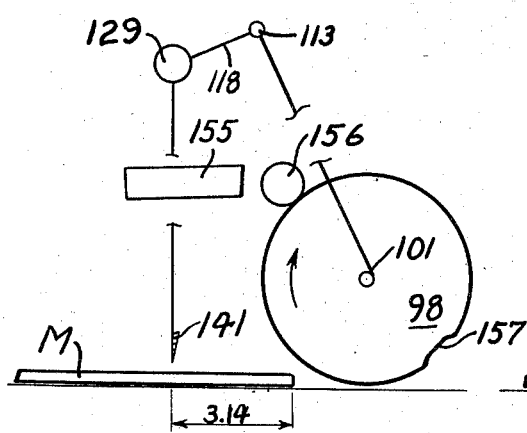

Fig. 19 shows the several parts again advanced through approximately one fourth of the cycle.

Figure 20:
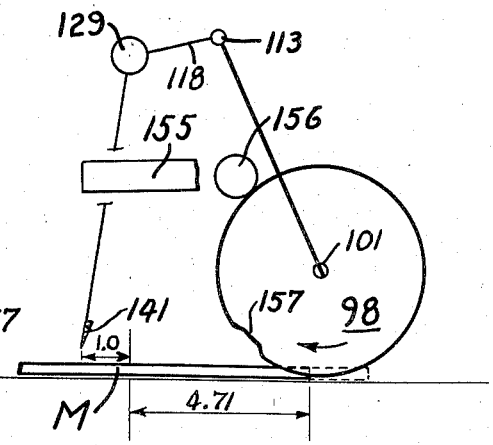

Fig. 20 shows the several parts at their last or three quarter position.

Figure 21:
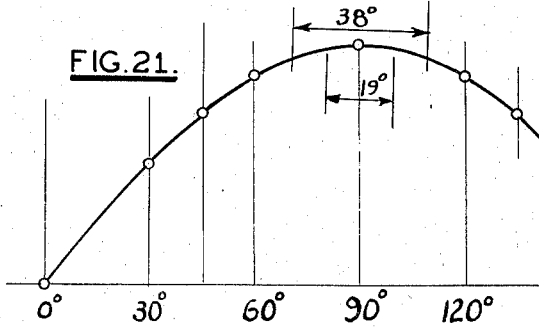

Fig. 21 illustrates a sine curve with the blade's vertical movement added thereto.

Like numerals refer to like parts throughout the several views.

Referring to Fig. 1, numeral 10 indicates the far side of a frame structure and 11 the close side. These sides are properly spaced by means (not shown) and a revolubly mounted shaft 12 extends thereacross. This shaft 12 receives the large roller or wheel 13 with the attached sprocket 14. This sprocket 14, diagrammatically shown, receives a chain 15, which chain encircles the small driver 16 rigid with the driving shaft 17.

A conveying belt 18, which belt may be formed of a steel band, runs around and is driven by the large roller 13, these parts moving in the direction indicated by the arrow C.

The closer side 11 of the main frame is broken away at the right hand side of Fig. 1 to show a turntable 19. This turntable receives the product after it leaves the belt 18 and usually changes the direction of travel of the cookies or the like inasmuch as the belt 18 and its associated structure is of rather great longitudinal dimension and space may be limited. However, the turntable or take-off rollers might continue to carry the product in the same direction if desired.

As shown in Fig. 1, the close side frame 11 carries a sub-frame end 21 of trapezoidal shape and a similar but left hand frame 22 is detachably mounted upon the opposite side 10. Also see Fig. 6. Bolts 23, one of which is shown in Fig. 1, hold these frames in position. A series of cross members, one of which is shown in Fig. 1 at 24, reinforce these ends of the sub-frame. A shaft 25 is revolubly received in these ends and rigidly or non-rotatably carries a rather large roller 26 and sprocket or driving means 27. A driving chain or the like 28 encircles the means 27 and the driver 29 which is keyed onto the previously mentioned driving shaft 17.

Shafts 31, 32, 33 and 34 extend across the ends of the sub-frames and carry the rollers 35, 36, 37 and 38, respectively, a carrier or belt 39 extending around these several rollers and the rather large roller 26, previously referred to, as shown. The roller 26 is the driving roller and the wrap of the belt 39 therearound, as shown, is desirable to prevent any slipping thereof. Thus a substantially positive drive is secured under all conditions.

The belt 39 receives the material from the belt 18, then later deposits it upon the turntable or conveyor 19. At this point the belt 39 travels around a small roller 41. This small roller 41 is carried at its ends upon the two arms 42, one of these being shown in Fig. 1. The arm 42 is swingably mounted at 43 upon the bracket 44 which is fastened as by welding at 46 onto the respective side frame 10 or 11. At least one of these swinging arms 42 has a stop 47 which prevents excessive downward movement of the delivery end of the belt 39 and also rests against the top side of the bracket 44 to prevent undue rearward movement of the several parts.

As shown at the left of Fig. 1, the receiving end of the belt 39 goes around the roller 48. This roller is adjustable as will now be described with reference to Figs. 14 and 15. As both end mountings are similar, only one will be described.

The roller 48 is revolubly mounted in the arm 49. The arm 49 is swingably mounted upon the pin 51 of the sliding crosshead 52 but may be rigidly locked thereto by means of the set screw 53. The crosshead 52 has a threaded opening which receives the adjusting screw 54. The adjusting screw 54 is revolubly mounted in the base frame 55 which has a cover 56 held in place by screws 57.

The adjusting screw 54 has a knurled operating nut 58 and a collar 59 is located at its other end to thus hold it against lengthwise movement as it is operated. If desired, locking means may be provided for holding it against accidental rotation. The frame or housing 55 may have end flanges 61 drilled to receive bolts 62 to fasten these frames or bushings onto their respective side frames 10 and 11.

The arms 49, previously mentioned, are shaped as shown, and carry a cross bar 63 welded therebetween at 64 as shown. A scraping blade 65, say 0.040" in thickness, may be formed of spring steel and the like, and is bolted or riveted onto the cross bar 63 as at 66. As shown in Fig. 16 and also in Fig. 14 the scraping edge of the blade is slotted at 67 as by sawing with a hack saw to form flexible segments 68, these segments being individually displaceable as illustrated in Fig. 16. Thus, in case of raised places or lowered places in the belt, the segments vary correspondingly and the action of the edge of the scraping blade 65 is efficient and suitable to properly carry the material upwardly thereover and onto the belt 39. It will be understood that the distance between the roller 48 and the rear of the scraping blade does not vary but that rotation of the adjusting screw 54 through the knurled knob 58 bodily moves both of these to their proper and desired positions. Thus the belt 39 may be kept at the proper tension and also it will be understood that the edges of the belt are separately adjustable.

The set screw 53 may be loosened in order that the edge of the scraping blade may be slightly spaced from the main belt 18 in the desired relationship or else tensioned thereagainst with the chosen amount of pressure. Notice too that this adjustment may also be individually made at the opposite sides.

From the several parts just described, it will be readily understood that the belt 39 may be placed into operative position with the main belt 18 whereupon the material will be transferred to the auxiliary belt, carried therealong, then deposited upon the turntable. Or, in case it is desired to dispense with the auxiliary belt, the set screws 53, see Figs. 14 and 15, may be loosened and the scraping blade and its appurtenant structure swung upwardly out of the way. Next the arms 42, these holding the discharge end of the belt, may be moved upwardly to inoperative position. And, if desired, the driving means 28 may be rendered inactive at this time.

When the auxiliary belt 39 is being operated, the same is driven from the shaft 17, this being the same shaft or prime mover which drives the main belt 18, through the sprocket 29, belt or driving means 28 and sprocket 27. This gearing is such as to cause the speed of travel of the belt 39 to equal that of the main belt 18.

Referring now to Figs. 1, 6 and 10, 71 and 72 are end members which are bolted onto the sub-frame members 21 and 22, respectively, as by means of bolts 73, one of these bolts being shown in Fig. 1. As is shown in Fig. 2, angle bars 74 and a flat bar 75 are welded onto the end frames 71 and 72 and extend completely across the main belt 18 and are located substantially above the first mentioned side members or frames 10 and 11.

As shown in Figs. 6 and 7, 76 is a stationary shaft which is carried by the ends 71 and 72. It extends beyond the end 72 and revolubly supports a combined pinion and pulley combination 77 driven by a belt 78 in turn driven by a pulley 79 on the shaft 81 of the motor 82.

The pulley 79 has one part 83 held onto the shaft 81 by the key 84 and a slidable part 85 which is spring pressed by means of the spring 86 located thereagainst and held at its other end by the collar 87. Thus the bodily movement of the motor 82, this movement now to be described, actually changes the effective or pitch diameter of the small pulley 79 thus giving variable speed change as shown.

The motor base plate 88 is welded at 89 onto the side 72. A threaded shaft 91 is revolubly mounted in the frame 88 and a handwheel 92 provides means for rotating this shaft 91. A sliding plate 93, carrying the motor 82 by the blots 94, has a depending boss 95 through which the shaft 91 threads. Thus rotation of the shaft 91 causes reciprocation of the motor and its pulley as indicated by the arrows D The pinion on the assembly combination 77 meshes with a gear 96 keyed onto the shaft 97. This shaft 97 is revolubly mounted in the ends 71 and 72. See Figs. 2, 6 and 7. As shown in Fig. 7 this shaft has a cam disc 98 keyed thereto at 99 inside of the frame end member 71 and an eccentric 101 keyed thereto at 102 outside of said end member. As shown in Fig. 5 an eccentric collar having a body portion 103 with a cover 104 held in place by screws 105 encircles the eccentric and a left handed threaded stem 106 threads therein and is locked thereto by the lock nut 107. A threaded sleeve 108 receives the left handed stem 106 and a right hand stem 110, with a lock nut 109, enters the other end of the sleeve. Thus rotation of the sleeve 108, after loosening the lock nut 109, shortens or lengthens this pitman. Thus the angle through which the cutting blade, to be described later, swings may be bodily shifted as desired within limits.

As shown in Figs. 2 and 3, the right hand stem 110 enters the bearing 111 and is locked thereto by the nut 112. The bearing 111 is swingably mounted upon the journal 113 of the sliding member or crosshead 114 and a spacer 115 holds them properly spaced. The outer end of the journal is threaded to receive the nut 116 and a washer 117 is located between the nut and the bearing 111.

As shown in Figs. 3 and 4, a casing or housing member 118 has a cross sectional shape designed to slidably receive the crosshead 114 and a threaded shaft 121 threads through the crosshead and is rotatably carried by the housing 118. This shaft has a knurled knob rigid therewith at one end at 122 and a spacer 123 between the knob and the end member of the housing. The other end of the shaft 121 carries a knurled locking nut 124 separated from the housing proper by a spacer or washer 125. Thus rotation of the knob 122 causes the blade to swing through a greater or less arc whereby its speed is necessarily increased. The housing 118 has an integral sleeve 126 extending therefrom, a set screw 127, see Fig. 4, holding the shaft 129 in position. The dotted lines indicate the full extension of one end of the shaft 129.

This shaft 129, with reference to Fig. 2, would lie at the intersection of the sectional line 4—4 and the medial longitudinal axis of the housing. The housing 118, and its parts, oscillate about this shaft as an axis as indicated by the arrows E.

The shaft 129, see Fig. 10, extends through a bearing 131 in the end 71, and to a similar mounting in the other end 72. This last mounting is not shown but reference to Fig. 6 shows the lateral extension of this shaft.

An arm 132 of cylindrical shape is connected onto the shaft 129 by means of the tapered pin 133 and the set screw 134, see Fig. 7, and a slide 135 is carried thereby. Actually there are two arms 132, together with their several parts, one near each end of the assembly, but inasmuch as these are of similar construction it is only deemed necessary or helpful to describe the action of one of these.

The slide 135, shown in section in Fig. 13, has a blade carrier 136 welded thereto at 137. Thus the two slides 135 and their associated blade carrier may move up and down along the members 132. Springs 138 encircle the arms 132 above the slides 135 whereby the blade carrier is urged downwardly at all times. The blade carrier is recessed as shown to receive the blade 141, beveled as shown at 142, see Fig. 12, and notched at 143. One notch 143 is shown in Fig. 10 and an adjusting screw 144 rides against the bottom of this slot and provides means whereby adjustment of the blade relative to its carrier may be had. Set screws 145, see Figs. 10 and 12, hold the blade in its adjusted position. As is shown in the drawings the blade carrier is slotted to receive the blade.

Directly beneath the blade, see Figs. 1, 7, 8 and 10, a bridge 146 is provided. As shown in Fig. 8 the end 71 is cut away so that the end of the bridge may be bolted at 147 onto the sub-frame member 21. Thus the top frame may be removed without disturbing the belt 39. A facing plate 148, having a curved edge 149, see Fig. 7, provides means for juxtaposing the carrying belt and its material in properly alined position relative to the cutting knife. The knife is shown in its lowest position in Figs. 10 and 12 and it is to be noted that there is a material space between the knife and the belt whereby the latter will not be damaged or cut.

As shown in Fig. 11, the blade carrier 136 has two upwardly extending arms 151, only one being shown, bored at 152 to receive the headed pin 153. A roller 154 may rotate upon this pin. This roller contacts the upper face of a rocker arm 155 which is freely oscillatable upon the stationary shaft 76 previously referred to. This arm 155 controls the downward movement of the cutting blade or the like.

The rocker arm 155 has a roller 156 thereon, see Fig. 7, and this roller rides upon the outer edge of the cam disc 98.

The cam has a depressed or lowered portion 157 of about 38° in length and the roller 156, entering this depression, permits the spring action upon the blade carrier to urge it and the blade downwardly with a quick snappy action to cause the partial severing of the material passing thereunderneath.

The material, after its partial severing, is carried along with the belt 39 and around the bend therein above the roller 38, see Fig. 1, whereupon the abrupt transition to a different plane causes the total separation of the material.

Referring to Fig. 17, this showing the knife 141 in about its mid-position, the roller 156 has entered or dropped into the cut away cam portion 157 and thus the spring 138 has acted to cause quick movement of the blade downwardly thus cutting the material. The material is represented by the letter M.

The showing of Fig. 18 indicates a next step in which the blade 141 has been moved upwardly due to the turning of the cam disc 98 about a quarter of a turn to a point where the roller 156 on the rocker arm 155 rides upon the concentric outer surface of the cam disc. Thus the blade is elevated above the material.

Figs. 19 and 20 represent, respectively, further positions of the several parts.

Fig. 21 illustrates a sine curve. This is or represents the speed of travel of the blade inasmuch as it moves with approximately harmonic motion. And, the speed of travel of the blade along the path of the carrier belt should equal the same at the time when the cutting occurs. Now, the time or instant of the cutting operation is at the middle portion of the stroke of the blade. That is, when it is moving at its top speed. Since this is the case, it will be understood that the amount of material which passes under the blade will be more in length than the distance that the cutting blade travels. From 0° to 90° the cutting blade actually travels the radius which can be called $r$ whereas pi divided by 2 or $1.57r$ is the travel of the material. So that, as shown in Figs. 17 to 20, inclusive, the material between cuts will be 57% longer than the stroke of the blade. The representation of the 38° line in Fig. 21 indicates that the variation of the speed of the cutting knife, assuming that it cuts during its full downward stroke, is about 6%. As a matter of fact, the cutting occurs only during the lower portion of the stroke and the difference in speed is less than 2%. This 2% is arrived at by making the maximum speed of the knife equal to the maximum speed of the belt and even better results can be obtained by making the maximum speed of the knife about 1% greater than the speed of the belt travel. By this manipulation, the knife enters the cooky at a speed equal to or greater than the speed at which the cooky is traveling and thus upsetting of both ends of the cookies is prevented. Or, one or both ends might be sealed by proper adjustment.

Having thus revealed this invention, I claim as new and desire to secure the following combinations and elements, or equivalents thereof, by Letters Patent of the United States.

I claim:

1. In a structure of the class described, a swinging element, means for driving the same to and fro, a slidable member located thereon, spring means for urging the slidable member in one direction, a movable member having a portion contacting the slidable member to slidably bear thereagainst, cam means bearing against the said movable member to urge it against the said spring, and tool means operated by the said slidable member.

2. A combination of elements as set forth in claim 1 in which the swinging element is operated so as to swing at substantially constant motion during a portion of its travel and in which the said cam means operates to cause movement of the said tool means during the time of said substantially constant motion.

3. A combination of elements as recited in claim 1 in which the driving means for the swinging element comprises a shaft attached to said swinging element and forms the axis about which it swings, a radial arm attached to the said shaft, a crank pin on said radial arm, an eccentric and a pitman connecting the eccentric and the crank pin.

4. A combination of elements as recited in claim 1 in which spring means urges the tool means to its operative position, said cam means having a depression which permits such action, a cam follower upon the said movable member, said axis of the cam means being located closer to the pivot of the crank arm than the axis of the follower.

5. A device of the character described comprising a cutting knife, means for mounting the same for swinging movement, additional means for permitting sliding movement of the knife, a third means for moving the knife so that its edge travels with substantially harmonic motion, and fourth means for moving the knife vertically at about its mid-point of travel, said fourth means including a cam disc, rigid means attached to said knife and spring means for urging the said rigid means against the said cam.

6. In combination, a frame, a bell crank pivotally mounted therein, a tool slidably mounted upon one arm of the bell crank, spring means for urging the tool away from the pivot, cam means for controlling the path of the tool, means for oscillating the other arm of the crank, said cam means being so shaped as to permit sliding of the tool at the center portion only of its cycle.

7. A combination of elements as set forth in claim 6 in which the rise and fall of the cam is within 38° of the cam, said cam being a disc cam.

8. In combination, a frame, a crank pivotally supported therein, means for oscillating the crank so that it moves back and forth, a slide thereon mounted for axial movement therealong, spring means for urging the slide axially, and cam means for controlling the said slide, and means for driving the cam means and the crank in predeterminedly timed relationship for the purpose described.

9. In a moving conveyor adapted to carry a strip of material thereon, the combination of, a tool, pivot means for mounting the same for swinging movement, said pivot means being located above the moving conveyor whereby the swinging movement thereof causes the tool to approach closest to the conveyor at the mid-point of its swing, additional means for permitting sliding movement of the tool, a third means for moving the tool along with the conveyor, and a fourth means for moving the tool vertically at the desired time.

10. A device of the character described comprising a tool, means for mounting the same for swinging movement, additional means for permitting sliding movement of the tool, a third means for swinging the tool about its mounting means through a chosen arc, a fourth means for moving the tool vertically, and a fifth means for bodily shifting the third means whereby the tool swings through a differently located arc.

11. A combination of elements as set forth in claim 10 but also having additional means for increasing or decreasing the particular angle subtended by the said chosen arc.

FRANK CHARLES WERNER.